(12) United States Patent
Willard

(10) Patent No.: US 8,944,010 B2
(45) Date of Patent: Feb. 3, 2015

(54) COLLAPSIBLE SOUND-DEADENING ANIMAL SHELTER

(76) Inventor: Tom Willard, Caroga Lake, NY (US)

( * ) Notice: Subject to any disclaimer, the term of this patent is extended or adjusted under 35 U.S.C. 154(b) by 0 days.

(21) Appl. No.: 13/245,660

(22) Filed: Sep. 26, 2011

(65) Prior Publication Data

US 2012/0247396 A1   Oct. 4, 2012

Related U.S. Application Data

(63) Continuation of application No. 12/751,874, filed on Mar. 31, 2010, now abandoned.

(60) Provisional application No. 61/165,321, filed on Mar. 31, 2009.

(51) Int. Cl.
*A01K 1/03* (2006.01)

(52) U.S. Cl.
CPC ..................................... *A01K 1/033* (2013.01)
USPC .......................................................... 119/498

(58) Field of Classification Search
CPC ..................................................... A01K 1/033
USPC ......... 119/474, 482, 491, 498, 496, 497, 499, 119/400, 453–545
See application file for complete search history.

(56) References Cited

U.S. PATENT DOCUMENTS

| | | | | |
|---|---|---|---|---|
| 3,280,796 A * | 10/1966 | Hatcher | ........................ | 119/499 |
| 3,328,908 A * | 7/1967 | Moe | ................................ | 43/131 |
| 3,581,708 A * | 6/1971 | Beck et al. | ..................... | 119/499 |
| 4,171,683 A * | 10/1979 | Godin | ............................. | 119/482 |
| 4,467,572 A * | 8/1984 | Somers et al. | ..................... | 52/70 |
| 5,317,113 A * | 5/1994 | Duda | ............................. | 181/285 |
| 5,887,436 A * | 3/1999 | Duddleston | ..................... | 62/3.62 |
| 6,055,937 A * | 5/2000 | Korpi | ............................. | 119/452 |
| 6,216,638 B1 * | 4/2001 | Pivonka et al. | ................ | 119/498 |
| 6,581,545 B1 * | 6/2003 | Foster | ............................. | 119/482 |
| D532,561 S * | 11/2006 | La Luzerne | .................. | D30/119 |
| 7,322,314 B1 * | 1/2008 | Sweeney | ........................ | 119/483 |
| 7,343,876 B2 * | 3/2008 | Frisbee | .......................... | 119/474 |
| 7,540,390 B2 * | 6/2009 | Bublitz et al. | ................. | 220/1.5 |
| 8,276,544 B2 * | 10/2012 | Seltzer et al. | .................. | 119/501 |

* cited by examiner

*Primary Examiner* — Rob Swiatek
*Assistant Examiner* — Ebony Evans
(74) *Attorney, Agent, or Firm* — Schmeiser, Olsen & Watts LLP

(57) ABSTRACT

The invention is a collapsible, sound-deadening shelter that can provide pets a place of refuge from noise. The shelter has a top panel formed from a sound-deadening material; at least two flaps coupled to the top panel; at least two side panels formed from a sound-deadening material, wherein each of the side panels is coupled to one of the two flaps; a rear panel formed from a sound-deadening material, wherein the rear panel is coupled by an additional flap to one of the top panel or the two side panels; and wherein the rear panel is removably coupled to the remaining of the top panel and the two side panels to which the rear panel is not already coupled by the additional flap. The shelter may be used as a stand-alone shelter, but it may also be placed over a pet container in order to make the container quieter.

7 Claims, 19 Drawing Sheets

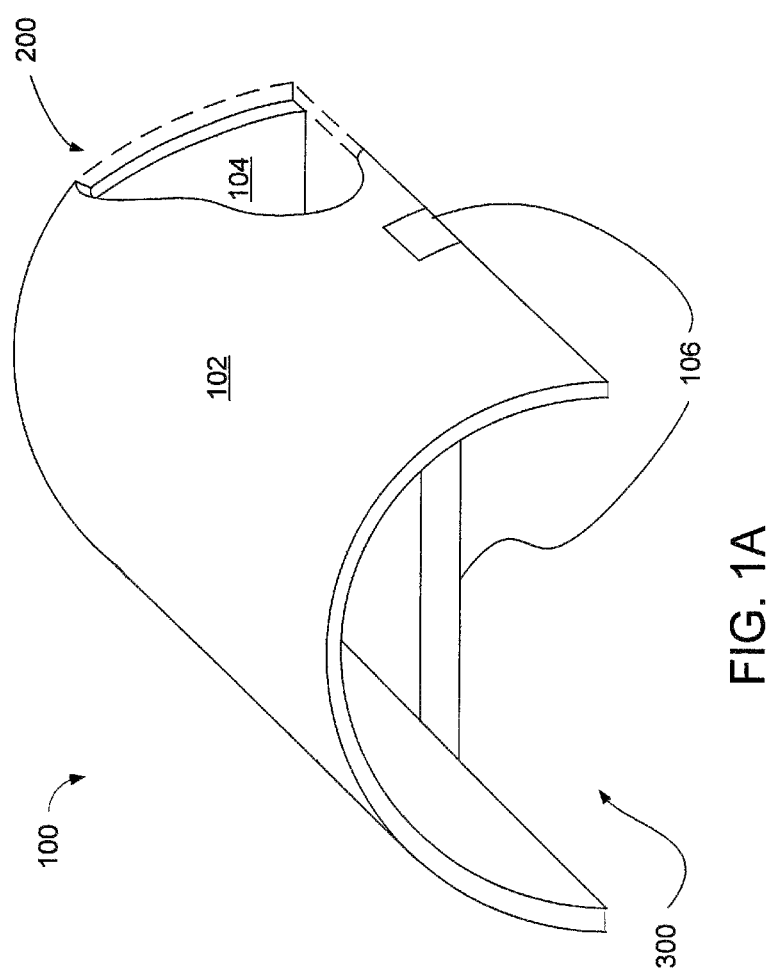

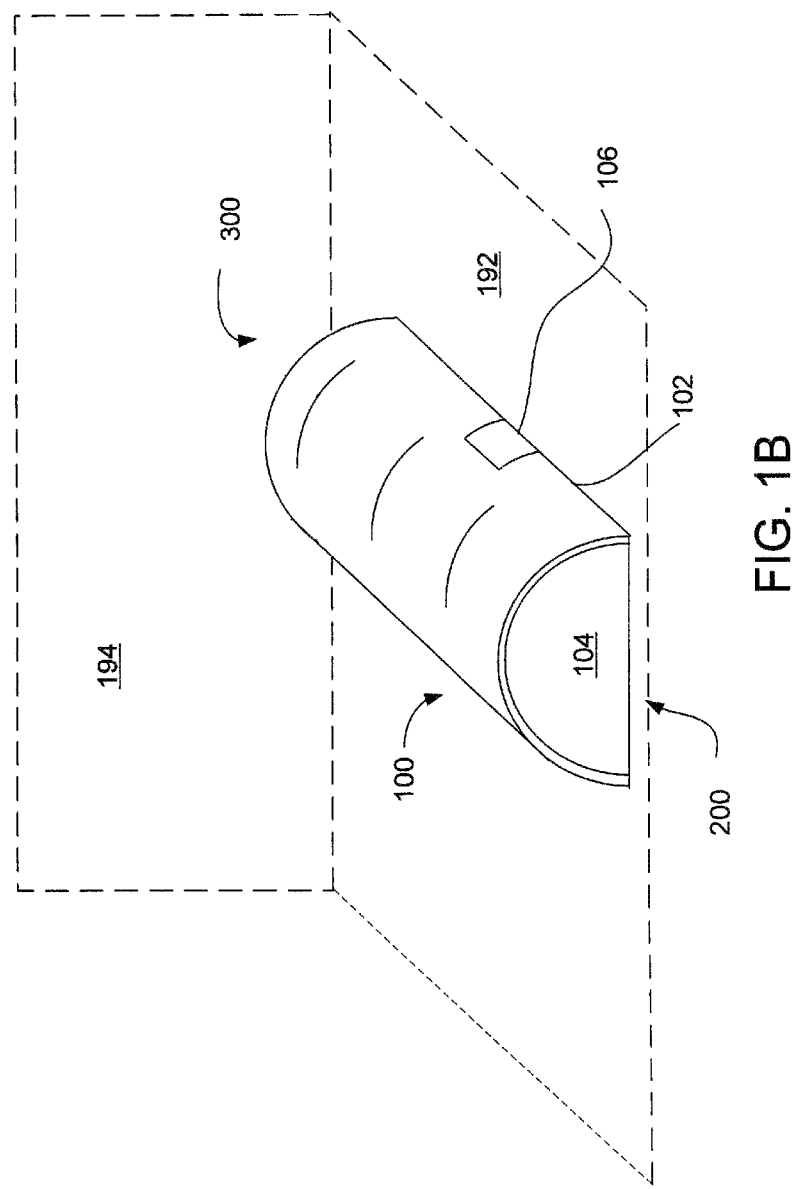

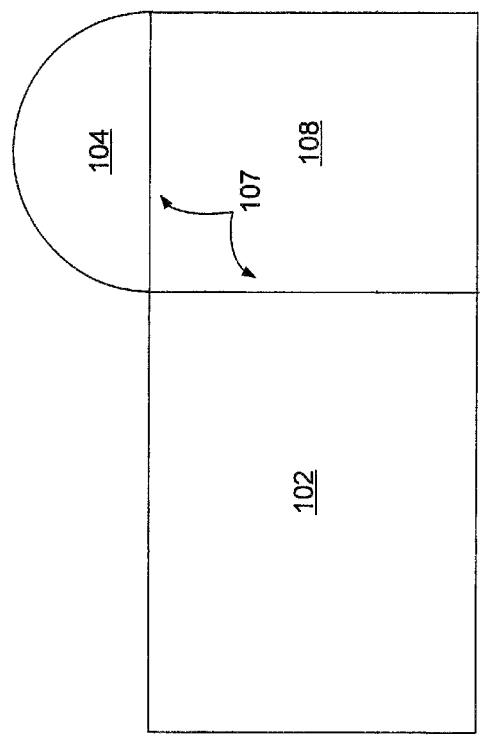
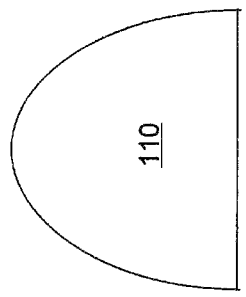
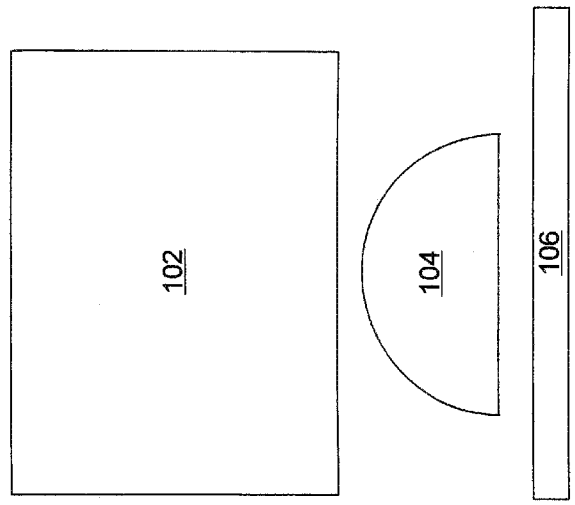
FIG. 3
FIG. 2
FIG. 1D

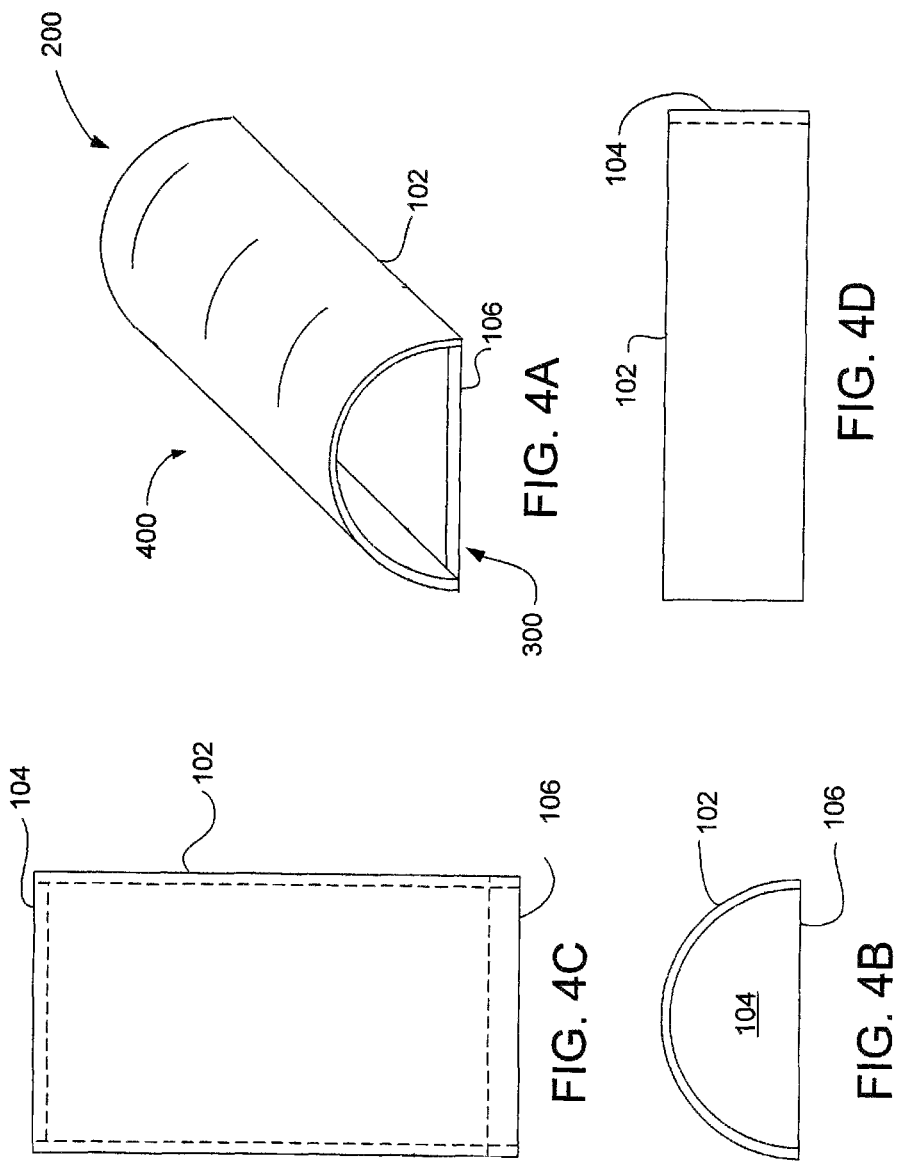

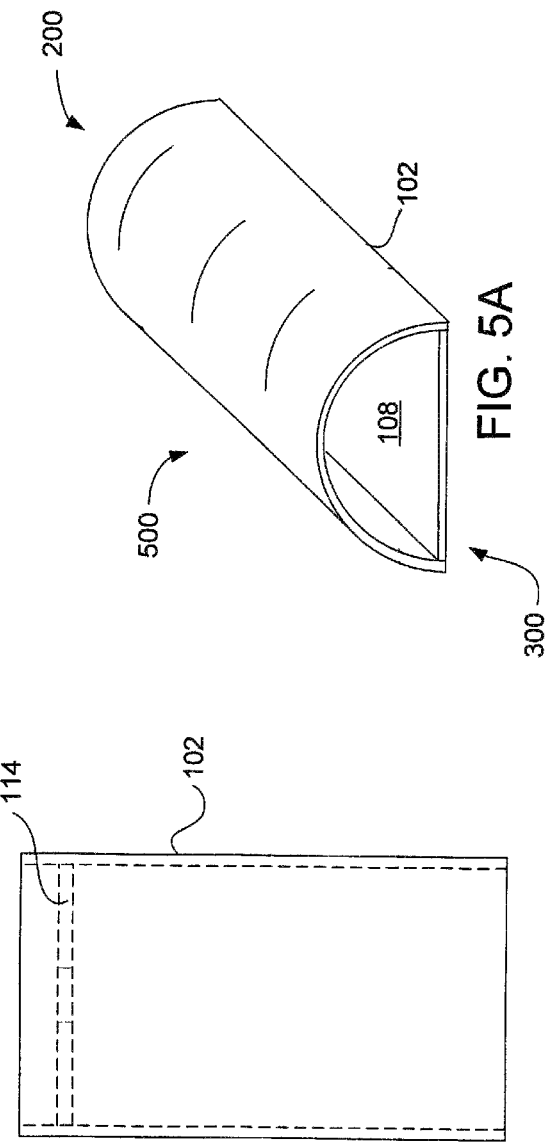

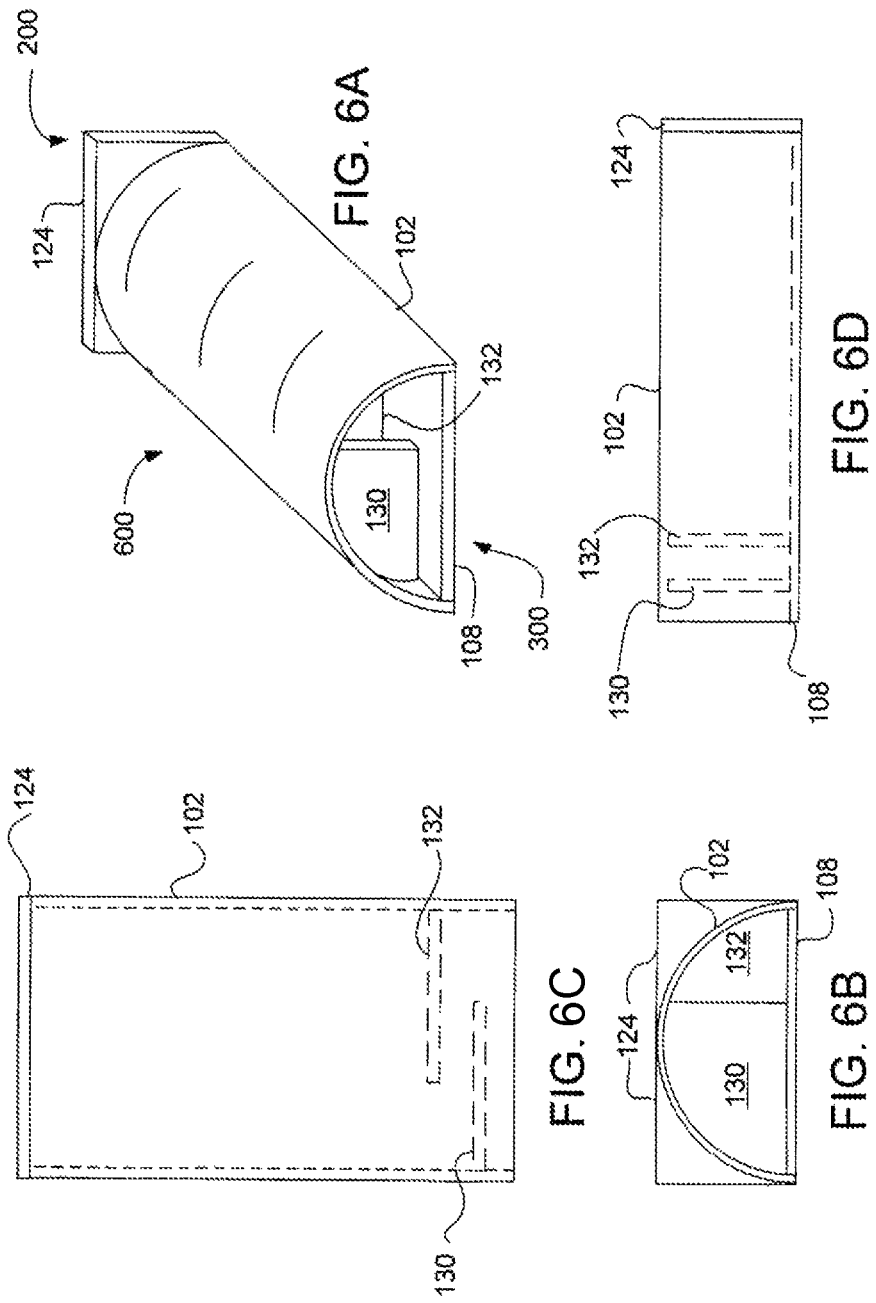

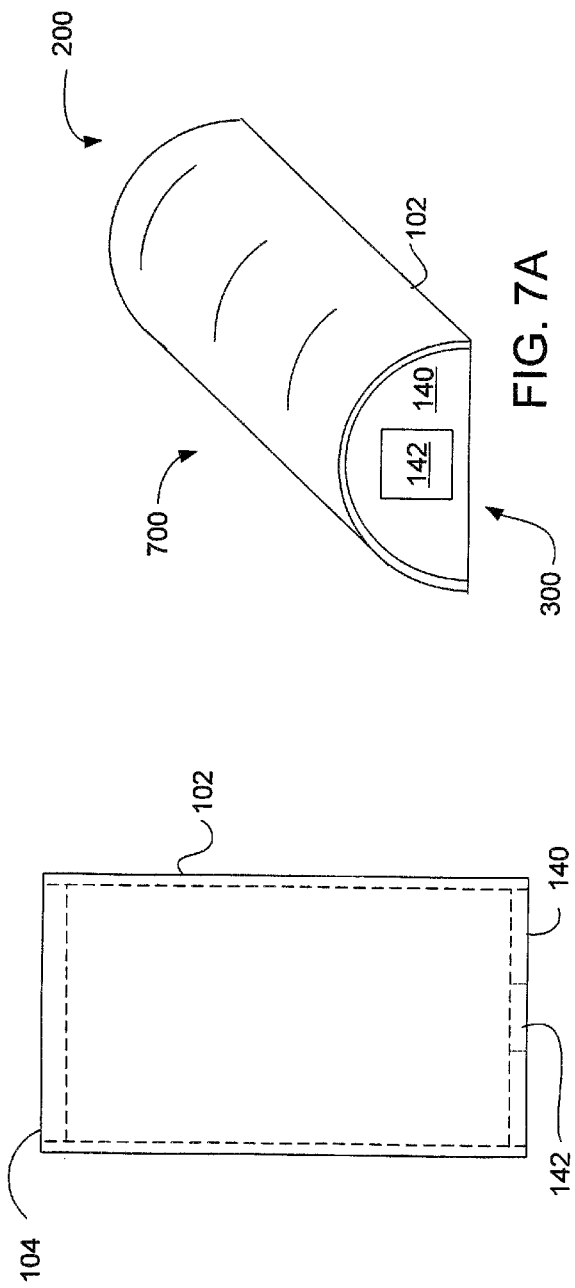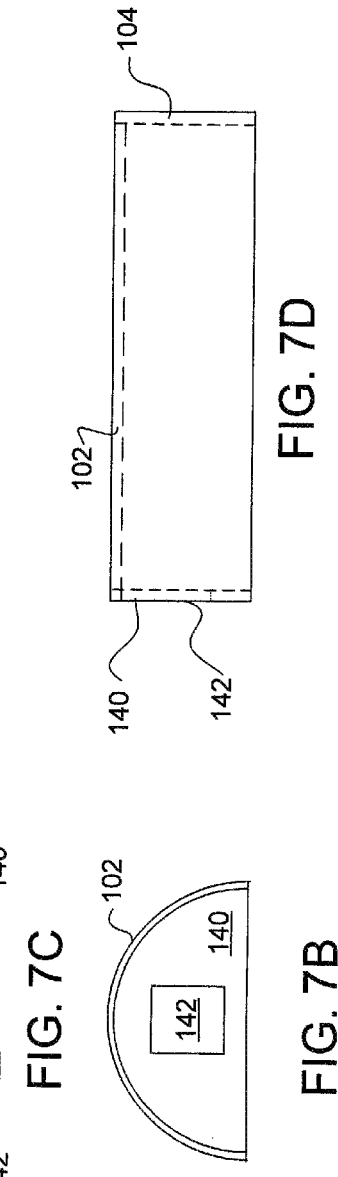

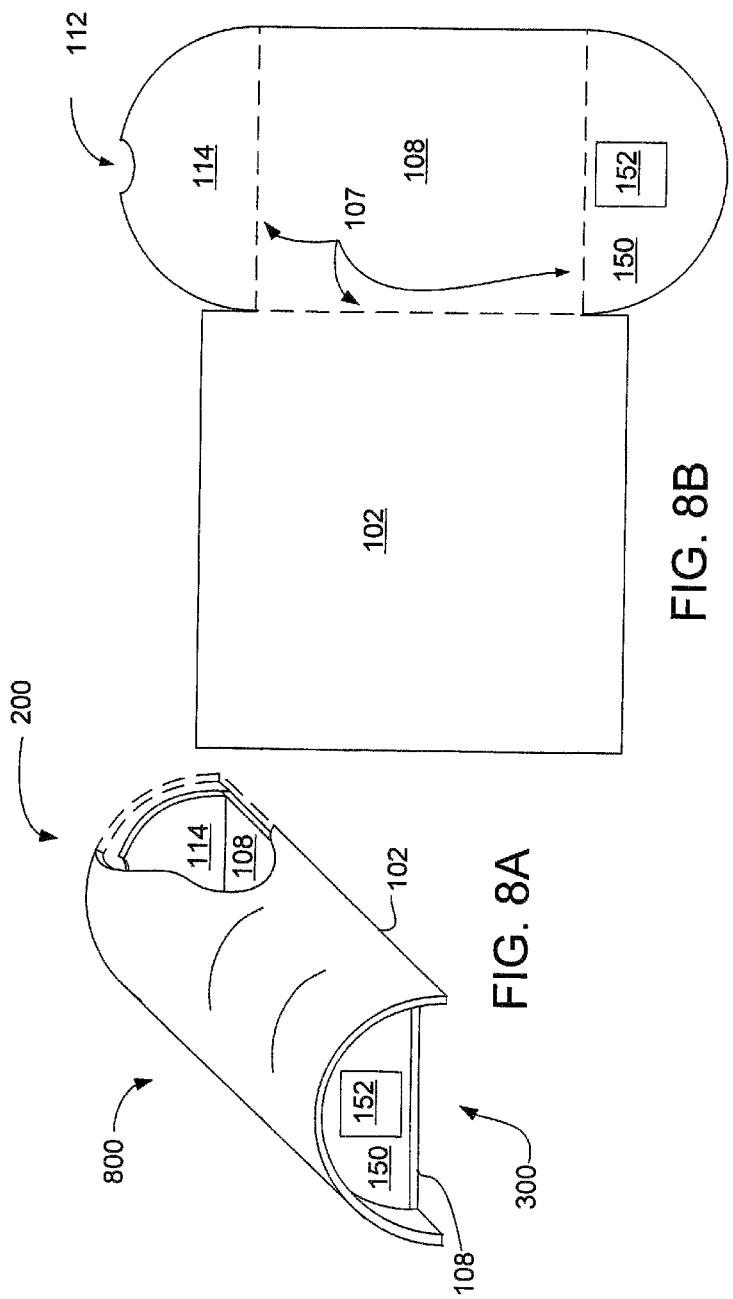

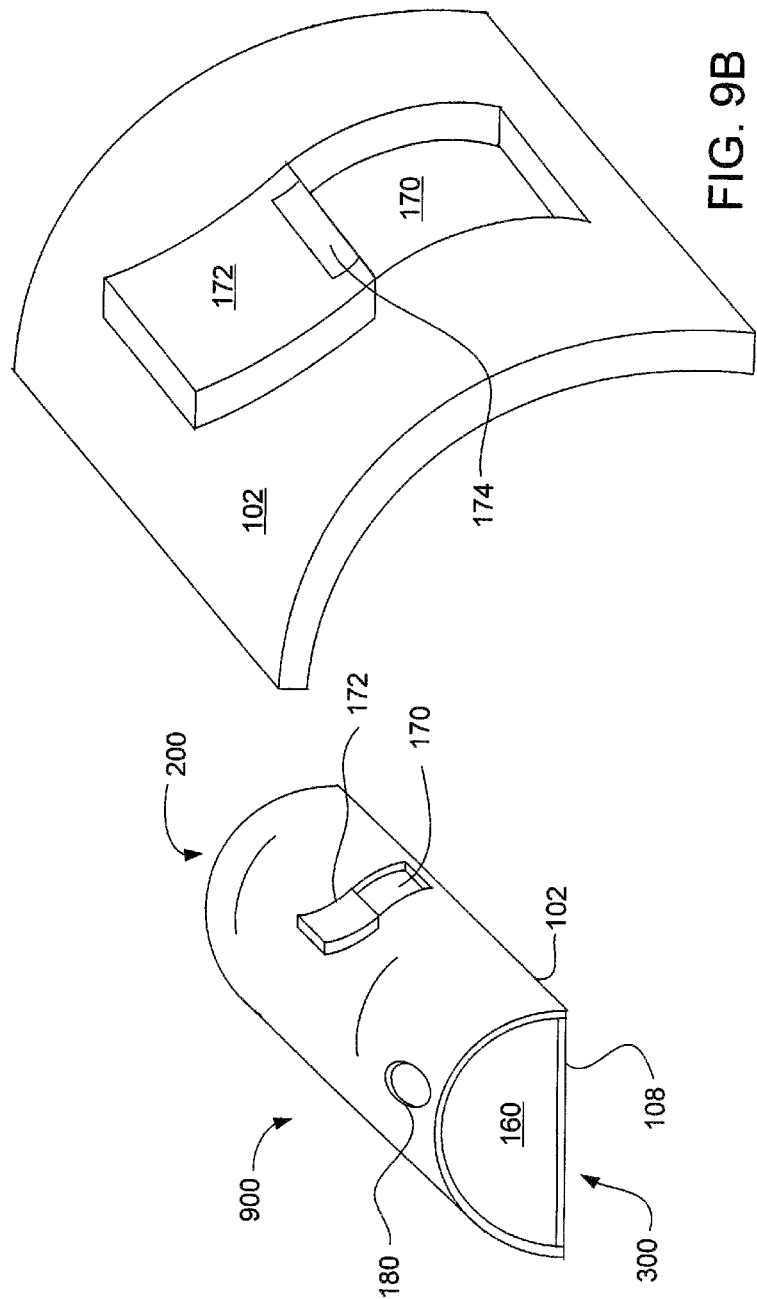

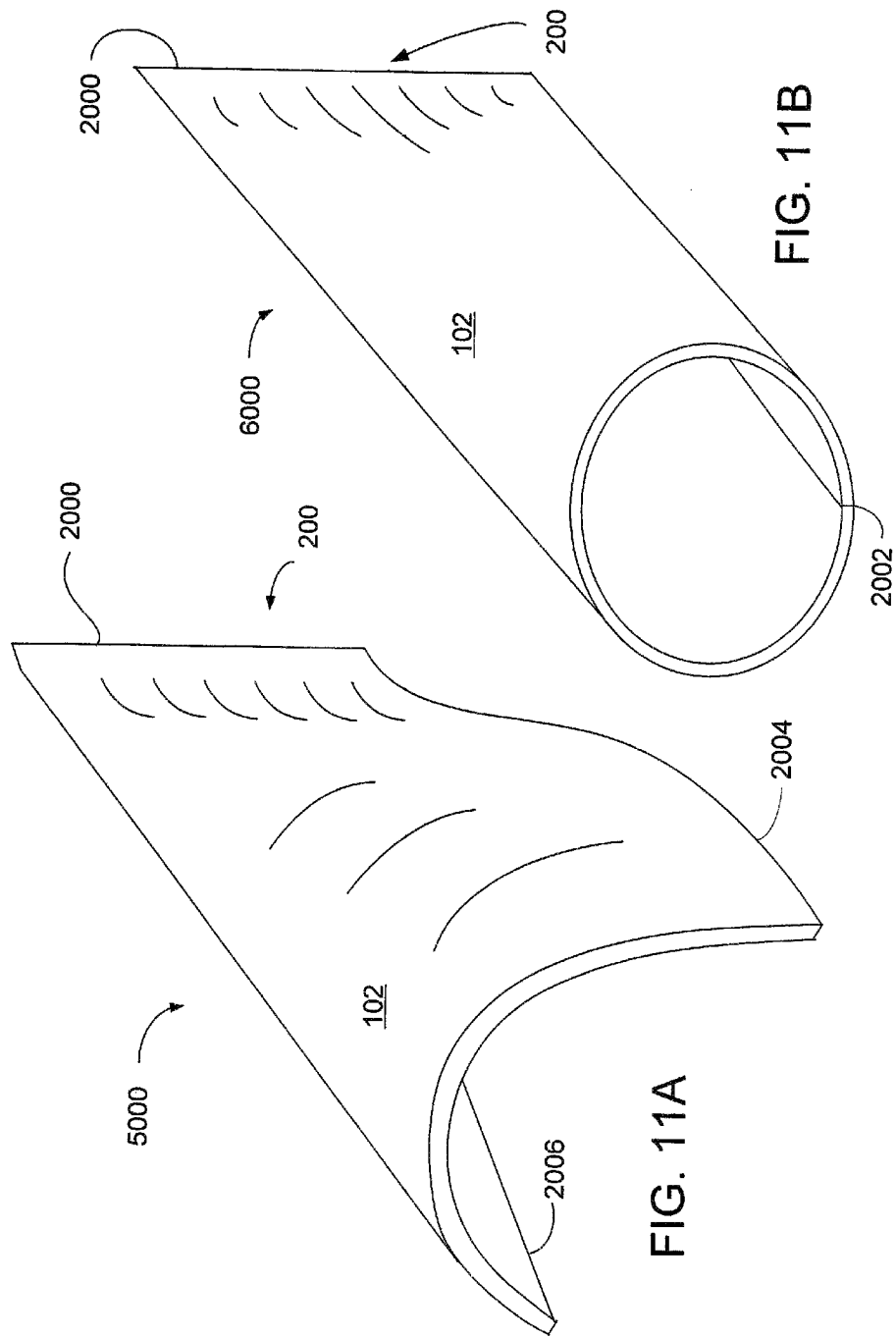

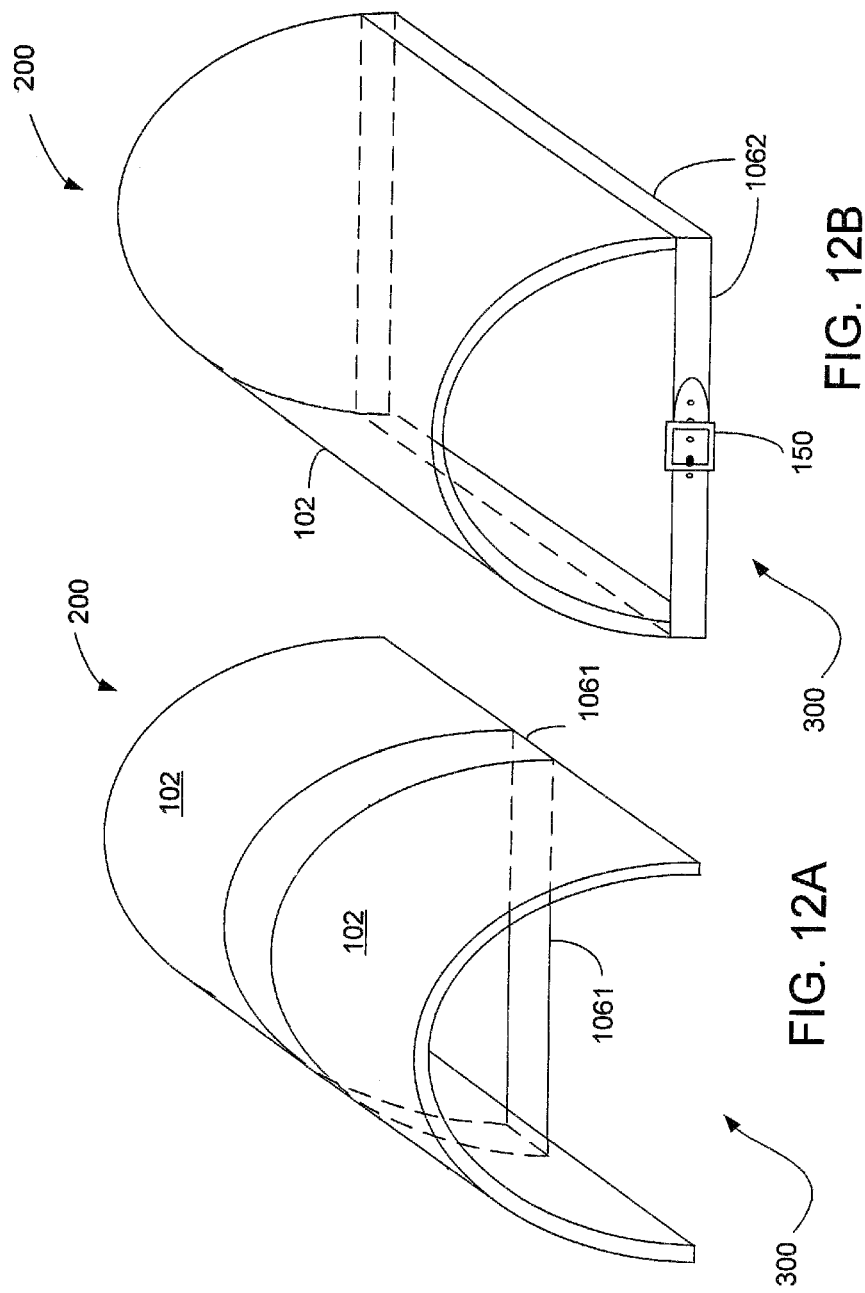

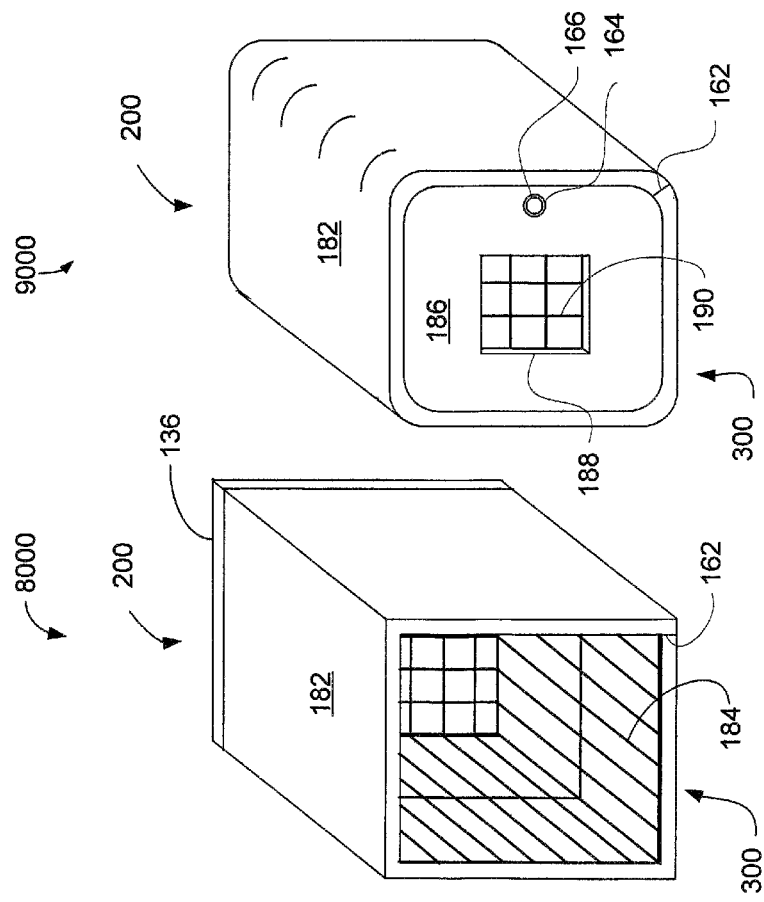
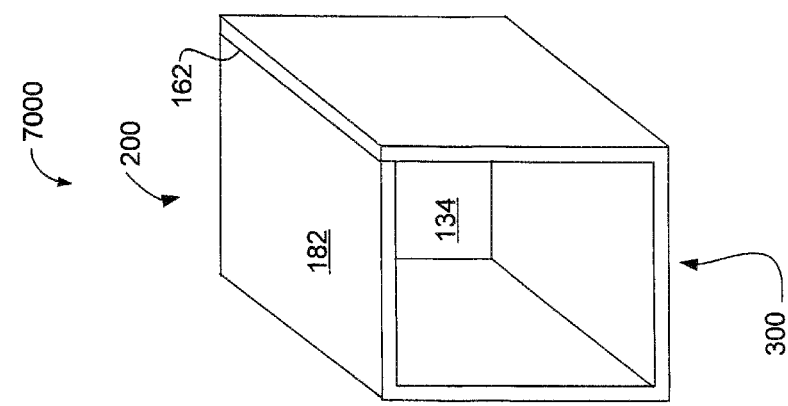
FIG. 13A   FIG. 13B   FIG. 13C

COLLAPSIBLE SOUND-DEADENING ANIMAL SHELTER

CROSS REFERENCE TO RELATED APPLICATION

This application is a continuation of the earlier U.S. Utility Patent Application to Tom Willard entitled "Collapsible Sound-Deadening Animal Shelter," Ser. No. 12/751,874, filed Mar. 31, 2010, the disclosure of which is hereby incorporated entirely herein by reference. U.S. Utility patent application Ser. No. 12/751,874, claims priority to U.S. Provisional Patent Application to Tom Willard entitled "Collapsible Sound-Deadening Animal Shelter," Ser. No. 61/165,321, filed Mar. 31, 2009, the disclosure of which is hereby incorporated entirely herein by reference.

BACKGROUND OF THE INVENTION

1. Technical Field

This invention relates generally to methods for sheltering animals. The invention also relates more specifically to protecting dogs and other pets from thunder and other loud noises.

2. State of the Art

Dogs and other pets oftentimes suffer anxiety as a result of hearing loud noises. A pet suffering from this condition may be referred to as thunder phobic. Thunder, jet engines, fireworks, gun shots, the barking of other dogs, and other loud noises may cause anxiety in dogs and other pets. More often than not, bring a "thunder phobic" pet inside does little to alleviate the problem. In addition, providing a permanent indoor shelter is not a feasible option for most pet owners because it may take up more floor space in a house or apartment than pet owners are willing to dedicate to pet shelter.

Accordingly, there is a need for an animal shelter that pet owners can use to conveniently provide shelter for a pet, or other animal, that shields the pet from loud noises.

DISCLOSURE OF THE INVENTION

The invention is a collapsible, sound-deadening shelter that can be deployed quickly and easily during periods of high noise levels to provide pets a place of refuge from noise. The structure of the invention comprises resilient sound-deadening material that is flexed during deployment into an arcuate or other shape and held in that shape by one or more connectors to form an arched enclosure. The preferred material is sound-deadening foam. A first end of the enclosure is substantially closed off, perhaps by an additional panel of sound-deadening material. In operation, a second end of the enclosure is placed near and facing a wall, leaving enough room for the pet to enter and exit. Other embodiments provide for pet ingress and egress through an opening in a panel which at least partially covers the second end, for a floor panel of sound-deadening foam, for openings for ventilation and observation and for a weather-resistant version. Methods and apparatus for retrofitting an existing pet container to be sound proof are also disclosed. After a period of use, the connectors are released to allow the resilient material to return to its normal flat shape for storage.

In alternate embodiments a collapsible shelter for protecting an animal from noise configured according to embodiments of the present invention may comprise a top panel formed from a sound deadening material; at least two flaps operably coupled to the top panel; at least two side panels formed from a sound deadening material, wherein each of the at least two side panels is operably coupled to one of the at least two flaps; a rear panel formed from a sound deadening material, wherein the rear panel is operably coupled by an additional flap to one of the top panel or the at least two side panels; and wherein the rear panel is removably coupled to the remaining of the top panel and the at least two side panels to which the rear panel is not already coupled by the additional flap.

In other embodiments a shelter for protecting an animal from noise configured according to an embodiment of the present invention comprises a pet container; a sound deadening cover placed around the container, the sound deadening cover further comprising; a top panel formed from sound deadening material; at least two side panels formed from sound deadening material and operably coupled to the top panel; and a rear panel formed from sound deadening material and operably coupled to the top panel and the at least two side panels; and wherein the sound deadening cover may be placed around the container when needed and removed at other times.

The foregoing and other features and advantages of the present invention will be apparent from the following more detailed description of the particular embodiments of the invention, as illustrated in the accompanying drawings.

BRIEF DESCRIPTION OF THE DRAWINGS

FIG. 1A is an exemplary view of a noise shelter for pets configured according to an embodiment of the present invention;

FIG. 1B is an exemplary view of the embodiment shown in FIG. 1A oriented towards and displaced from a wall;

FIG. 1D is an exemplary view of three discrete components of the embodiment of FIG. 1A;

FIG. 2 is an exemplary view of a discrete alternate first end closure;

FIG. 3 is an exemplary view of three integrated parts in their collapsed form used to erect an embodiment having a floor panel;

FIGS. 4A-D are views of a noise shelter for pets configured according to an embodiment of the present invention;

FIGS. 5A-D are views of a noise shelter for pets configured according to an embodiment of the present invention;

FIGS. 6A-D are views of a noise shelter for pets configured according to an embodiment of the present invention;

FIGS. 7A-D are views of a noise shelter for pets configured according to an embodiment of the present invention;

FIG. 8A is an exemplary view of a noise shelter for pets configured according to an embodiment of the present invention;

FIG. 8B is an exemplary view of the integral collapsed panels for making a noise shelter for pets configured according to the embodiment of the present invention shown in FIG. 8A;

FIG. 9A is an exemplary view of a noise shelter for pets configured according to an embodiment of the present invention;

FIG. 9B is an enlarged exemplary view of the pet egress and ingress opening and closure shown in FIG. 9A;

FIG. 11A is an exemplary view of a noise shelter for pets configured according to an embodiment of the present invention;

FIG. 11B is an exemplary view of a noise shelter for pets configured according to an embodiment of the present invention;

FIGS. 12A and 12B are two exemplary views of embodiments of the present invention showing alternate ways to secure the first panel in arcuate shape;

FIGS. 13A-13C are exemplary views of embodiments of the present invention showing an alternate shape and use with a pet crate;

DETAILED DESCRIPTION OF EMBODIMENTS OF THE INVENTION

Figure 1C:
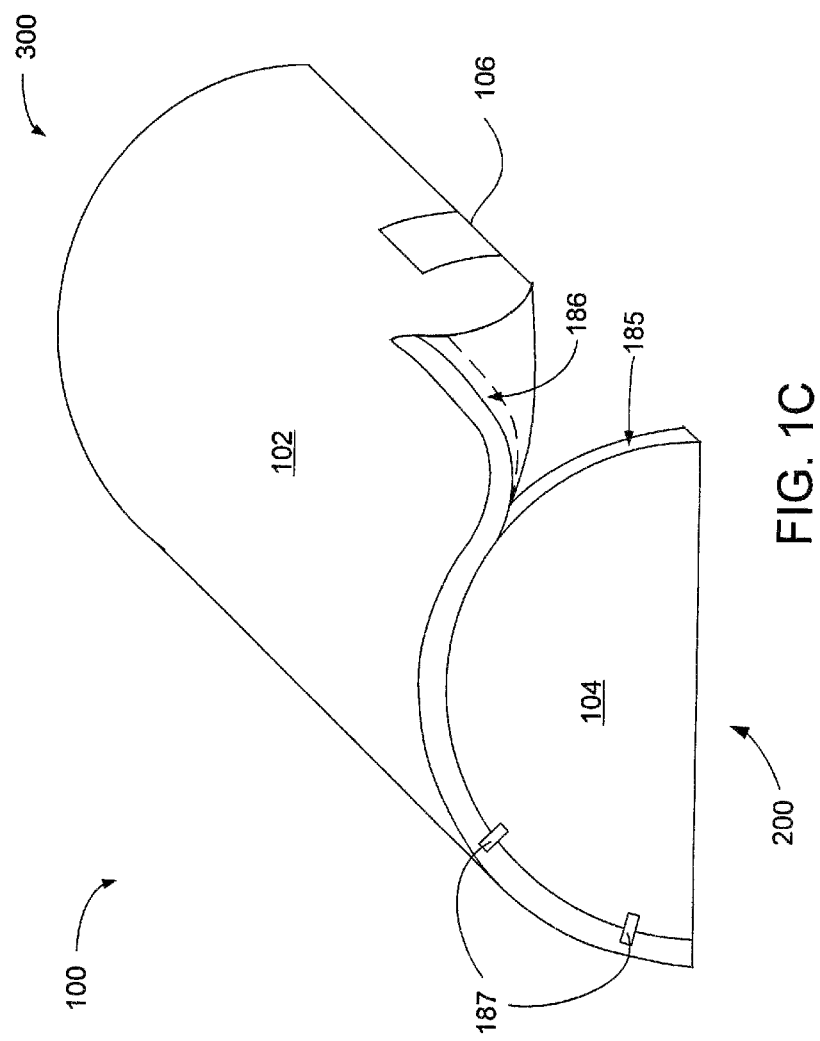
FIG. 1C is an exemplary view of the embodiment shown in FIG. 1A showing connection of two panels.

The invention concerns collapsible shelters made of sound-deadening foam. For simplicity, "sound-deadening foam" will be used herein to mean sound-deadening materials, including composites, and also including the literal meaning "Sound-deadening foam," taken literally, is a commercially available product that reduces the amount of sound penetrating it or reflecting from it. The types manufactured by the Foam Factory, Inc. of Fort Lauderdale, Fla. are satisfactory for some embodiments. The sound-deadening properties are a function of the surface configuration of the sound-deadening foam, the material properties of the sound-deadening foam (i.e., damping characteristics at frequencies of interest), and the thickness of the sound-deadening foam.

Commercial sound-deadening foams typically have noise reduction coefficients (NRCs) of at least about 0.50 as determined by testing under ASTM Standard C-423-01. By another measure, sound-deadening foams typically provide at least about 18 dB of attenuation for impinging sound. Depending on their sensitivity to noise, some pets need higher levels of noise reduction. Animals that have particularly sensitive hearing, for example: some hunting breeds of dogs, may require materials providing an NRC of about 0.75 or greater. Extremely sensitive pets, for example: those bats or owls which hunt by sound, may require materials with an NRC of about 0.95 or greater. Individual variation among animals of a particular type or breed may also impact the selection of a range of NRCs for that animal's shelter.

A panel of sound-deadening foam may consist of a single sound-deadening material or it may be a composite which includes at least one layer of sound-deadening material. Polyurethane and melamine foams are examples of materials used to make sound-deadening foam sheets or panels. Melamine has the advantage of being fire resistant.

FIG. 1A shows an exemplary embodiment 100 of the invention comprising a first panel of resilient sound-deadening foam 102 bent into an arcuate configuration and a connector (a strap, in this embodiment 100) 106 which holds the first panel 102 in the arcuate configuration. A cutaway is provided in the view to show an example of a panel of sound-deadening foam 104 which closes the first end 200 of the shelter. The dashed lines in FIG. 1A represent edges of the cutaway portion of panel 102. In the illustrated embodiment, the strap 106 connects two sides of panel 102 and extends upward on the exterior surface of panel 102. Alternatively, the strap 106 may end on the edges of panel 102 rather than extending upward on the exterior surface, or may extend upward on the interior surface. The attachment between the ends of the strap 106 and the panel 102 may be buckles, hook and eye attachments, VELCRO®, or the like. The embodiment illustrated in FIG. 1A has an open second end 300 for ingress and egress by a pet. In a variation of embodiment 100, panel 104 comprises rigid sound-deadening foam. In another embodiment, the panels are not all of the same thickness. In yet another embodiment, panel 104 may be a composite material comprising at least one rigid layer and at least one sound-deadening layer.

FIG. 1B shows a view of embodiment 100 erected on floor 192 with the second open end 300 facing and near a wall 194. The first end 200, which is closed by panel 104, is facing away from the wall. The dashed lines defining the floor 192 and the wall 194 signify that the floor and the wall are not elements of the apparatus but are used in the method of sheltering a pet from noise. Arcuate first panel 102 is held in its arcuate shape by connecting strap 106 and optionally by connectors between first end 200 closure panel 104 and arcuate first panel 102.

FIG. 1C shows an embodiment 100 being erected and connected with strap 106 and with VELCRO® along the arcuate edge 185 of panel 104 which connects to reciprocal VELCRO® on an edge-width face portion 186 adjacent to the edge of the foam panel 102. The dashed line on the interior face of panel 102 shows the boundary of the edge-width face portion 186 that connects to edge 185 to assemble this variant of embodiment 100. FIG. 1C also shows an example of the use of discrete connectors 187 to connect panel 104 to panel 102. The discrete connectors may be VELCRO®, hook and eye connectors, buckles, or other fasteners known in the art. For example, in an embodiment in which the panels are covered with fabric, snaps and buttons may be used for discrete connectors and zippers may be used for continuous connectors. Discrete and continuous connectors need not both be used for the same task. In an embodiment where the first end 200 is closed by a panel 104 that attaches to panel 102 so as to hold panel 102 in arcuate form, the strap may be placed nearer the second end 300 or omitted altogether.

FIG. 1D shows an example of separate pieces that may be used to construct the embodiment of FIG. 1A. The first panel 102 is shown in flat form for storage. The second panel 104 is used to close off the first end 200 (FIG. 1A). The connector, a strap 106 in the illustrated embodiment, may be connected as shown in FIG. 1A or in other ways to achieve the purpose of holding the first panel 102 in its arcuate shape. The second panel 104 need not be the section of a circle shown in FIG. 1D. In FIG. 2, an example of a second panel 110 for another embodiment is illustrated. In the embodiment of FIG. 2, the corresponding first panel should be sized with a length equal to the length of the arcuate edge of second panel 110. FIG. 3 shows, in flat storage configuration, an embodiment in which floor panel 108 has been used as the connector and has been substituted for the strap 106 (FIG. 1A). The floor panel 108 of the embodiment of the invention is integral with first panel 102 and second panel 104 even in the collapsed state.

The simplest integration is to make the integrated set of panels from a single piece of sound-deadening foam. The panels 102, 108, 104, thus made of foam, can then be folded, bent, and connected to erect the shelter. In another embodiment, the separate panels may be integrated by being enclosed in a fabric or other flexible covering having seams at the fold lines 107. The edges 107 in FIG. 3 indicate edges 107 along which to fold the integrated panels 102, 104, 108 to construct an embodiment of the shelter. The disassembled integrated panels may be stored in flat, folded, or rolled form or some combination thereof. Folding for assembly results in contact between edges and edge-width face portions adjacent to edges as previously shown in FIG. 1C. Attachment may be continuous along the edges and edge-width face portions adjacent to the edges of the foam panels 102, 104, and 108 where the panels 102, 104, and 108 meet after folding (for example, by using VELCRO® strips) or the attachments may be a plurality of discrete buckles, snaps, hook and eye systems, or other attachment devices known in the art.

FIG. 4A shows an example of an alternate embodiment 400 with a different placement of the connector 106 (a strap, in this embodiment 400) placed to connect the sides of the arcuate first panel 102. The strap connects opposite sides of the arcuately bent first panel 102 by the bottom edges of the first panel 102 proximate to the second end 300 of the shelter. Attachment to the bottom edges may be by hook and eye fasteners, buckles, or the like. FIGS. 4B, 4C, and 4D are front, top and side views of the embodiment of FIG. 4A. The dashed lines in FIGS. 4C and 4D are hidden lines showing the edges of the first panel 102, the strap 106, and the second panel 104. In the illustrated embodiment, the outer surface of the second panel 104 is flush with the first end 200 of the shelter 102. The illustrated width of the strap 106 is notional: it represents any width that will hold the sides of panel 102 a desired distance apart. In a variation of this embodiment, a floor panel may be placed inside shelter 400 and over the strap 106. The floor panel over the strap need not be connected to the sides of the shelter 400. The floor panel over the strap may be of a material other than sound-deadening foam.

FIG. 5A shows an example of an embodiment 500 having a connector 106 (FIG. 1A) embodied as a floor panel 108 of sound-deadening foam connecting the sides of arcuate first panel 102. Embodiments with floor panels are particularly useful on hard floors because such floors can conduct sound to the pet as it rests directly on the floor. The attachments between the panels 108 and 102 may be continuous along the edges of the foam panels 102 and 108 where the edges meet (for example, VELCRO® strips) or the attachments may be discrete attachments. FIGS. 5B, 5C, and 5D show the front, top, and side views, respectively. The dashed lines represent hidden lines showing second panel 114 and edges of first panel 102. Second panel 114 is recessed into the first end 200 of the arcuate first panel 102. Second panel 114 features an opening 112 for additional ventilation. Ventilation is important for pets and critically important if children may be also be playing in the shelter. The amount that second panel 114 is recessed into the first end 200 of arcuate first panel 102 is sufficient to prevent thunder or other noises from taking a straight-line path into the ventilation opening 112. In a particular embodiment, the amount of recess of panel 114 from the first end 200 of arcuate first panel 102 may be determined by the user at the time the shelter is erected. In a variable-recess embodiment, the second panel 114 may be a discrete, as opposed to integral, panel.

For an alternate embodiment adapted for use outdoors, the recess may also be used to keep direct sunlight or rain from entering the ventilation opening. An embodiment adapted for use outdoors comprises water resistant foam panels. The water resistant panels may be selected from a water resistant foam, given a water resisting surface treatment, or covered in a waterproof material. Selecting a sound-deadening foam which is flame resistant or fire resistant may improve safety.

FIG. 6A shows an exemplary embodiment 600 of the invention wherein a second panel of sound-deadening foam 124 is placed against the outer edge of the first end 200 of arcuate first panel 102. Panel 124 is shown as a rectangle, but may be other shapes. Panel 124 may be integral or discrete, may be whole or contain openings, and may be flexible or rigid. The exemplary embodiment 600 illustrated in FIG. 6A has a floor panel 108 of sound-deadening foam. The embodiment of FIG. 6A also has panels of sound-deadening foam 130, 132 recessed into the second end 300 to reduce noise entering thereby. Panels 130 and 132 may be placed, for example, in a staggered and offset configuration so that there is no direct path for noise to enter through the second end 300 of the shelter, but air can move into and out of the shelter around panels 130 and 132. In another embodiment, the floor panel 108 may be partial, covering only the portion of floor between panel 132 and panel 124.

Because panels 130 and 132 are flexible and resilient, even large pets can enter by deforming the panels. For example, a large dog puts his head into the shelter in the opening to the right of panel 130, pushes forward and to the left, deforming panel 130 and moving his head into the opening to the left of panel 132. The dog continues pushing forward into the shelter, deforming both panels 130 and 132, the panels resiliently returning to their original shape after the dog is in the shelter. The process is reversed for egress. In a particular embodiment, the panels 130 and 132 may be sized and spaced apart responsive to the size of the pet. Alternatively, in another embodiment, panels 130 and 132 may be used without floor panel 108. FIGS. 6B, 6C, and 6D are front, top, and side views, respectively, of the exemplary embodiment 600 of the invention shown in FIG. 6A. The dashed lines in FIGS. 6C and 6D represent hidden lines showing interior edges of panels 102, 108, 130, and 132. In an alternate embodiment, the partial closure of the second end 300 by panels 130 and 132 may be used with a ventilated 112 (FIGS. 3A-D) first end closure panel 114 (FIGS. 3A-D).

FIG. 7A shows an exemplary embodiment 700 of the invention wherein the second end 300 is closed by a panel of sound-deadening foam 140 having an opening 142 for the ingress and egress of the pet. In another embodiment, panel 140 is recessed into the second end 300. In a variation of an embodiment having a second-end 300 closure panel 140, panel 140 has at least one other opening in addition to the opening 142 for pet ingress and egress. In an alternate embodiment, opening 142 has a closure. In embodiments with the second end 300 closure panel 140, care must be exercised to ensure proper ventilation for the pet. In another embodiment, the invention comprises a floor panel 108 (FIG. 6A) with the second-end closure panel 140 having opening 142. In yet another embodiment, arcuate panel 102 has an opening for pet ingress and egress. In still yet another embodiment, the first end closure panel 104, 110, 114, or 124 has an opening for ingress and egress. In yet another alternative embodiment, the floor panel 108 has an opening for ingress and egress for use on snow for sled dogs, for example.

FIG. 8A shows an exemplary embodiment 800 of the invention wherein the panels are integral even in their collapsed state and second end 300 is closed by a recessed panel of sound-deadening foam 150 having an opening 152 for the ingress and egress of the pet. In embodiment 800, the first end 200 may be closed by a recessed panel 114 of sound-deadening foam which has a ventilation opening 112 (FIG. 8B), as shown in the cutaway portion view of FIG. 8A. The dashed lines in FIG. 8A show the edges of the first panel 102 that have been cut away to show first end 200 closure panel 114 and floor panel 108. FIG. 8B shows the panels 102, 108, 114, and 150 integrated and collapsed for storage. Panel 150 has opening 152. To erect the shelter from the flat state, the foam or encasing outer fabric is folded along fold lines 107 and connected along the meeting edges by continuous or discrete attachments. The collapsed integral panels 102, 108, 114, and 150 may be folded or rolled for storage as with any flat fabric such as a towel or bed sheet.

FIG. 9A shows an exemplary embodiment 900 of the invention wherein the second end 300 is closed by a flush panel of sound-deadening foam 160. Arcuate panel 102 has an opening 170 for the ingress and egress of the pet and another opening 180 for ventilation and observation. Opening 170 is shown with a closure 172. The bottom of the opening 170 is at or above the top of floor panel 108. In an embodiment, opening 180 may also have a closure. FIG. 9B is an enlarged view of the opening 170 in the arcuate panel 102 showing a closure 172 hinged with a flexible strip of fabric 174 which may be glued or otherwise adhered to both the closure 172 and to the top edge of the opening 170. The illustrations in FIGS. 9A and 9B are not intended to limit sizes, shapes, or styles of openings or closures; these features, if desired, should be adapted to the size and habits of the pet.

Figure 10:
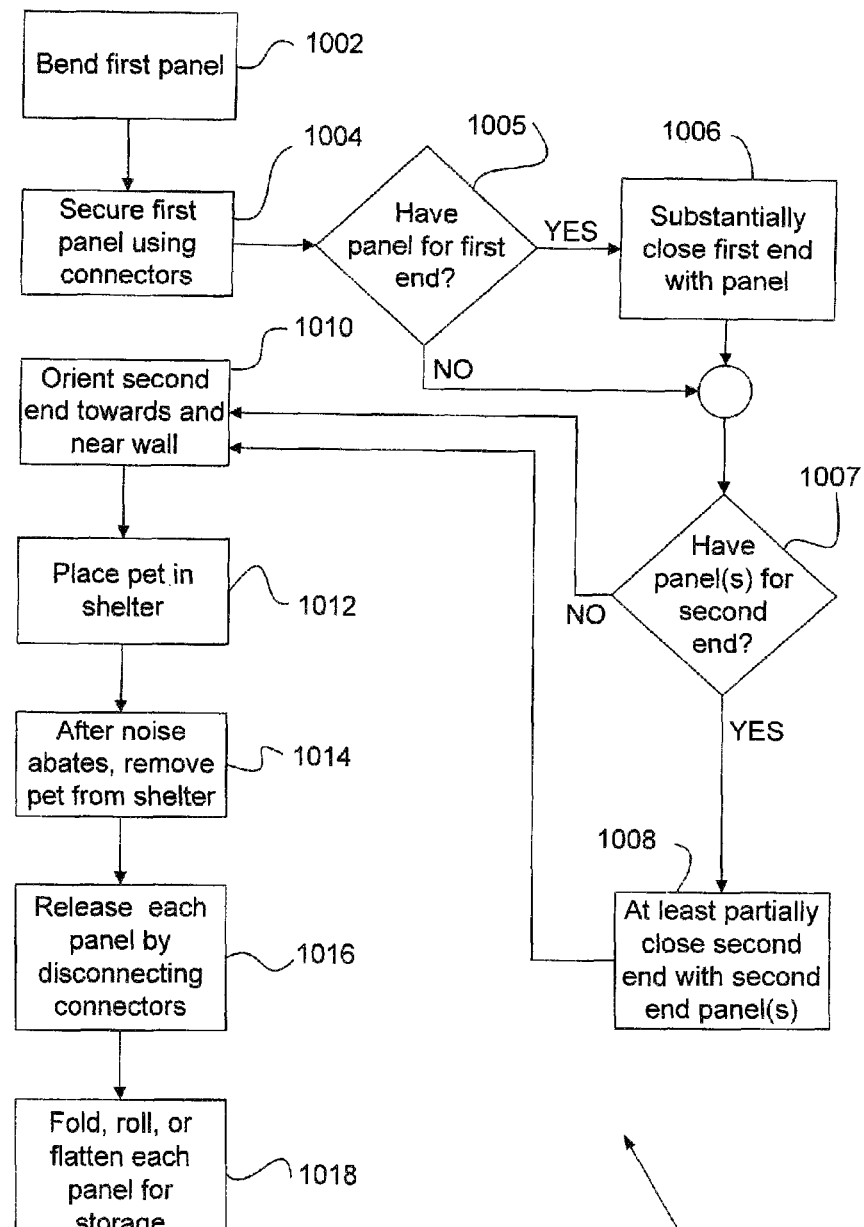
FIG. 10 is a process flow diagram for the method of erecting an embodiment of the shelter.

FIG. 10 shows an exemplary process 1000 flow diagram for erecting, using, and storing the sound-deadening pet shelter. The first step 1002 is bending the first panel into an arcuate shape. The second step 1004 is attaching at least one connector to hold the first panel in its arcuate shape. In a simpler embodiment, the user connects the two sides of the arcuate first panel with a strap. In many simpler embodiments, the third step 1010 is to place the shelter on a floor with an open end oriented toward and near a wall. If the embodiment includes a first end panel (Step 1005), the third step 1006 is closing the first end with the first end panel. In a particular embodiment, steps 1004 and 1006 may be combined by using connectors to the first end panel to help hold the first panel in its arcuate shape. If the embodiment includes no second end panel (Step 1007), the process may proceed with step 1010: orienting the shelter with the second end toward and near a wall. However, if there is at least one second end panel in the embodiment being erected (Step 1007), the process goes to step 1008: installing the second end panels. The user attaches the second end panels with snaps, zippers, VELCRO®, buckles, or the like, depending on the embodiment of the shelter apparatus.

Once the shelter is completely erected, the user places the pet in the shelter 1012. A user with a trained pet may accomplish step 1012 by indicating to the pet that it should enter the shelter. A pet owner may bribe the pet with a treat or toy to induce it to enter the shelter. Once the pet finds that the shelter is a good place to escape noise, the pet will know to go inside when the shelter is erected, thereby accomplishing step 1012 on its own volition. When the noise environment returns to comfortable levels, the pet is removed from the shelter 1014 by bribe, command, by the user's physical action, or by the pet's own volition. In an alternate embodiment, step 1014 and step 1016 may be combined by disassembling the shelter 1016 to evict the pet 1014. Once the shelter is disassembled, the panels are stored either flat, rolled, folded, or a combination thereof, as may be suitable for the embodiment of the shelter apparatus and the available storage space.

In a very simple embodiment 5000, as shown in FIG. 11A, the first end 200 edges of the first and second sides of the first panel 102 of resilient sound-deadening foam are connected to form a vertical seam 2000. The connection maintains the first panel 102 in an arcuate shape. Edges 2004 and 2006 rest on a floor, or similar surface, or on the ground while the shelter is in use. Connecting may be accomplished with a zipper, for example. The connection of the two edges may use a continuous connector or a series of discrete connections along the seam. Additionally, a connector such as that shown in FIG. 1 or FIG. 5A may be used to help secure and maintain the arcuate shape of the first panel and spacing between edges 2004 and 2006.

FIG. 11B shows a simple embodiment 6000 wherein the connector additionally brings opposite edges 2004 and 2006 (FIG. 11A) of the first panel 102 into contact with one another to form a seam 2002 in a tube of sound-deadening foam. The first end 200 may be closed in the same ways as first end 200 is closed in embodiment 5000 as shown in FIG. 11A. In a variation of the simpler embodiment, the first end 200 of the tube may be left unconnected. Connection of edges 2004 and 2006 may be by an extension of the exemplary zipper of embodiment 5000 along edges 2004 and 2006 (FIG. 11A). The zipper may be glued or sewn to the edges of panel 102, sown to a slip cover that covers panel 102, or connected by other means known in the art. In a simple embodiment, the first panel 102 has one zipper that first brings the first and second side edges of the first end 200 together and is further attached around and beyond the first end corners of the first panel 102 to connect the first and second side edges 2004 and 2006 (FIG. 11A) of panel 102. Thus, the simple embodiment comprises a first panel 102 of resilient sound-deadening foam having a zipper attached to three sides of panel 102, the closed zipper being length of one and one-half sides of panel 102.

The seam 2002 formed by the connected, touching sides 2004 and 2006 (FIG. 11A) of the tube may be oriented by rolling the tube. The tube may be, for example, rolled 180 degrees to place the seam 2002 above the pet and thus limit the opportunity for pet hair to catch in the zipper. Also, the first-end 200 closure seam 2000 may be oriented horizontally for shorter pets or vertically for taller pets. Other connectors, discrete or continuous, may substitute for the zipper.

FIG. 12A shows an alternate embodiment wherein the connector comprises a longer strap used as a belt 1061 that wraps entirely around the first panel 102. The belt 1061 is deployed over the top and under the bottom of the shelter 102 and 106. In any embodiment using a belt, the belt may be a continuous band of flexible material, thereby saving the cost of a buckle or other belt closure. In any embodiment using a belt, the belt may be elastic. In another alternate embodiment as shown in FIG. 12B, the belt 1062 may go around the base of the shelter 102 and 106 may attach only to itself, such as by a buckle 150.

FIG. 13A shows an alternate embodiment in which the shape is rectangular instead of arcuate. In the embodiment of FIG. 13A, the shelter is free-standing. First end 200 panel 134 is highly resilient or rigid and is used to define the shape of the structure. First panel of sound-deadening foam 182 wraps around and connects to panel 134 by continuous attachment devices such as, for example, VELCRO® or a zipper. Panel 182 also makes continuous attachment to itself along seam 162. Second end 300 is open. In a variation of the embodiment of FIG. 13A, panel 182 is formed as a tube, obviating the need for a seam 162. The formation as a tube may be in a mold.

FIG. 13B shows an alternate embodiment in which the shelter is sized and shaped to cover a pet cage 184 such as, for example and as shown, a wire-framed dog crate. Typically, the pet container 184 would have a wall covering the open end 300, but this wall was omitted for clarity of the drawing. A first panel of sound-deadening foam 182 covers the top, bottom and sides of the pet container and connects continuously along seam 162. An end panel of sound-deadening foam 136 covers the first end 200. End panel 136 may attach continuously or by at least one discrete connector. In a variation of the embodiment, there is no floor portion of panel 182 and panel 182 attaches to the pet cage 184 by a plurality of discrete connectors. In an embodiment, the cover of sound-deadening foam is removably attached to the cage. In any embodiment, the shelter may have at least one opening for ventilation and cooling.

FIG. 13C shows an alternate embodiment in which the shelter conforms to a molded plastic pet container 190, visible in the drawing only by the window bars, which may be metal, plastic, or other material. Molded plastic pet containers are frequently used in air transport of pets, which can be a high noise environment. A panel of sound deadening foam 186 substantially covers the door of pet container 190 on the second end 300 of the shelter. Panel 186 is shown with a cut out 188 for the window in the door and a cut out 164 for the doorknob 166. The panel covering first end 200 may be similar to panel 134 in FIG. 13A or panel 136 in FIG. 13B. Panel 182 covers the top, bottom and sides of the pet container and connects to itself along seam 162. In a variation of the embodiment shown in FIG. 13C, an additional hard-sided shell covers the sound-deadening foam shelter to facilitate air transport. In yet another variation of the embodiment of FIG. 13C, the sound-deadening foam shelter is sized and shaped to be deployed inside the pet container 190. In another internally deployed embodiment, attachment of the sound-deadening foam (182, 186, and the first end panel) to the interior walls is provided to prevent the shelter from shifting into a position that blocks ventilation. In yet another internally deployed embodiment, panel 182 has no floor portion. In additional embodiments, a pet dwelling, such as a dog house, or a pet cage, such as a dog crate, may be used in place of a pet container. In another embodiment, the shelter of sound-deadening foam is placed over a pet cage or pet dwelling and within a pet container.

Figure 15:
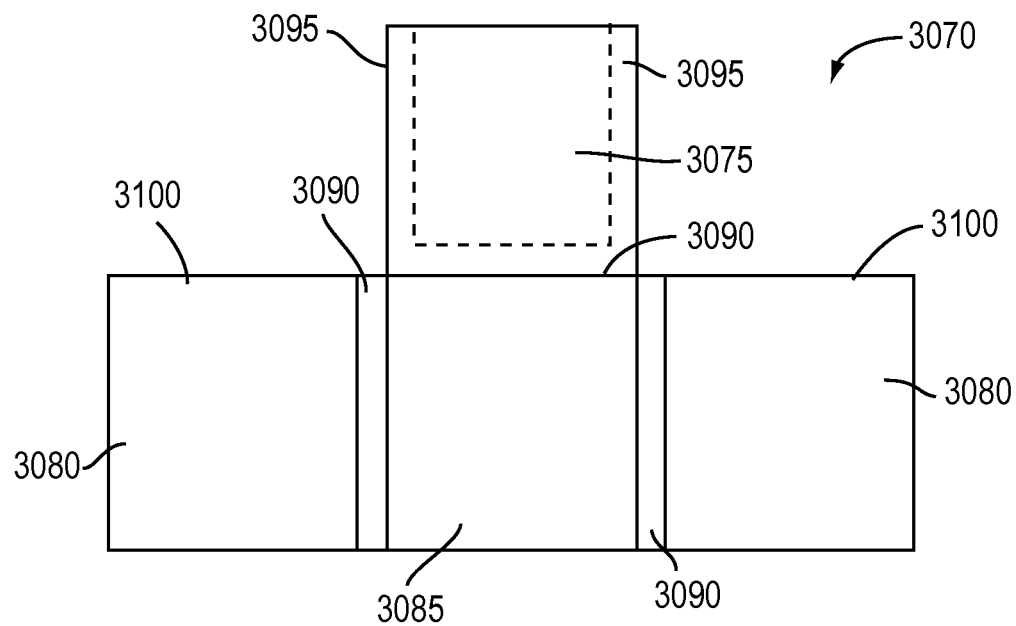
FIG. 15 is an exemplary view of a shelter for pets, which may be placed over a pet container, collapsed.

FIG. 15 shows an embodiment of a sound deadening pet shelter 3070 in an unassembled or unerected position. The pet shelter 3070 comprises a top panel 3085 which is formed from sound deadening material such as sound deadening foam (described previously), sound deadening board, sound deadening coatings, sound deadening fabrics and the like. The top panel 3085 may be formed from any material that provides the desired amount of sound deadening or muffling. The top panel 3085 may be any shape desired such as round, hexagonal, square, rectangular or the like. The top panel 3085 may be formed from rigid or flexible material depending on the intended environment and use for the sound deadening pet shelter 3070. In FIG. 15, the top panel 3085 is rectangular in shape. The top panel 3085 will also typically have very little thickness. Typically it will be desirable to form the top panel 3085 from a relatively thin material, such as a sheet of material or foam. The top panel 3085 may also be covered with a slip cover such as fabric sewn to fit around the panel 3085. The fabric protects the top panel 3085 from sun, moisture, wear and tear. If the top panel 3085 is formed from sound deadening fabrics, then a slip cover may not be needed.

At least two side panels 3080 are coupled to the top panel 3085 through flaps 3090. The at least two side panels 3080 may be formed from sound deadening material such as sound deadening foam (described previously), sound deadening board, sound deadening coatings, sound deadening fabrics and the like. The at least two side panels 3080 may be formed from any material that provides the desired amount of sound deadening or muffling. The at least two side panels 3080 may also be formed in any shape desired, such as circles, octagons, squares, rectangles and the like. The at least two side panels 3080 will also typically have very little thickness. Typically it will be desirable to form the at least two side panels 3080 from a relatively thin material, such as a sheet of material. The at least two side panels 3080 may also be covered by a slip cover such as was described in conjunction with the top panel 3085. Each panel in the shelter 3070 may have a separate slip cover or the slip cover may encompass the entire shelter. If the at least two side panels 3080 are formed from sound deadening fabric, then a slip cover may not be needed.

The top panel 3085 is operably coupled to the at least two side panels 3080 by at least two flaps 3090. Each one of the at least two side panels 3080 is coupled to one of the at least two flaps 3090 which is in turn coupled to the top panel 3085. In FIG. 15, the top panel 3085 is coupled or connected to three flaps 3090. The flaps 3090 are essentially joints or hinges. Typically these flaps 3090 will simply be part of the slip cover discussed above. The slip cover may be made to cover the entire pet shelter, leaving gaps or seams between the various panels where there is just fabric. These gaps or seams are flaps 3090. The flaps 3090 may be formed from a section of flexible material such as fabric from the slip cover that may be bent as desired. These flaps 3090 may also be couplings such as snaps, zippers, Velcro®, buttons, adhesive or the like. The flaps 3090 may be permanently coupled or connected to the top panel 3085 or they may be removably attached. In alternate embodiments, the flaps 3090 could be rigid 90 degree angle pieces that may removably connect the panels.

A back panel 3075 is coupled to a third flap 3090 shown in FIG. 15. The back panel 3075, like the other panels, is formed from sound deadening material such as sound deadening foam (described previously), sound deadening board, sound deadening coatings, sound deadening fabrics and the like. The back panel 3075 may be formed from any material that provides the desired amount of sound deadening or muffling. The back panel 3075 may also be formed in any shape desired, such as circles, octagons, squares, rectangles and the like. The back panel 3075 will also typically have very little thickness. Typically it will be desirable to form the back panel 3075 from a relatively thin material, such as a sheet of material. The back panel 3075 may also be covered by a slip cover such as was described in conjunction with the top panel 3085. In alternate embodiments, the back panel 3075 may simply be an empty slip cover without any sound deadening material. Each panel in the shelter 3070 may have a separate slip cover or the slip cover may encompass the entire shelter. If the back panel 3075 is formed from sound deadening fabric, then a slip cover may not be needed.

The back panel 3075 is also coupled to at least one attachment device 3095. The at least one attachment device 3095 may comprise anything that allows the back panel 3075 to be removably coupled to at least one of the other panels. The at least one attachment device 3095 may be permanently coupled to the back panel 3075 or to at least one of the other panels. The at least one attachment device 3095 may be Velcro®, snaps, buttons, zippers, adhesive or the like. In FIG. 15, the back panel is shown with two attachment devices 3095, one on each side. These attachment devices 3095 couple or attach the back panel 3075 to a distal end 3100 of each of the at least two side panels 3080.

Figure 16:
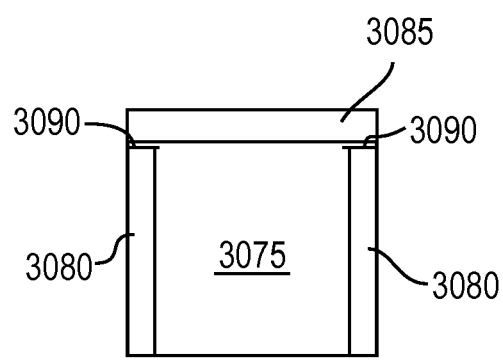
FIG. 16 is an exemplary view of a shelter for pets, which may be placed over a pet container, erected.

FIG. 16 illustrates an embodiment of the sound deadening pet shelter in the erected or assembled position. The erected or assembled position is the position in which the shelter is used. In order to assemble the pet shelter shown in FIG. 15, the attachment devices 3095 are attached to the distal end 3100 of each of the side panels 3080. This forms the shelter into a partial cube as shown in FIG. 16. In FIG. 16, you can see the top panel 3085, two flaps 3090 which couple the side panels 3080 to the top panel 3085 and the top panel 3085. The back panel 3075 is also visible in back of the top panel 3085 and the side panels 3080.

Figure 17:
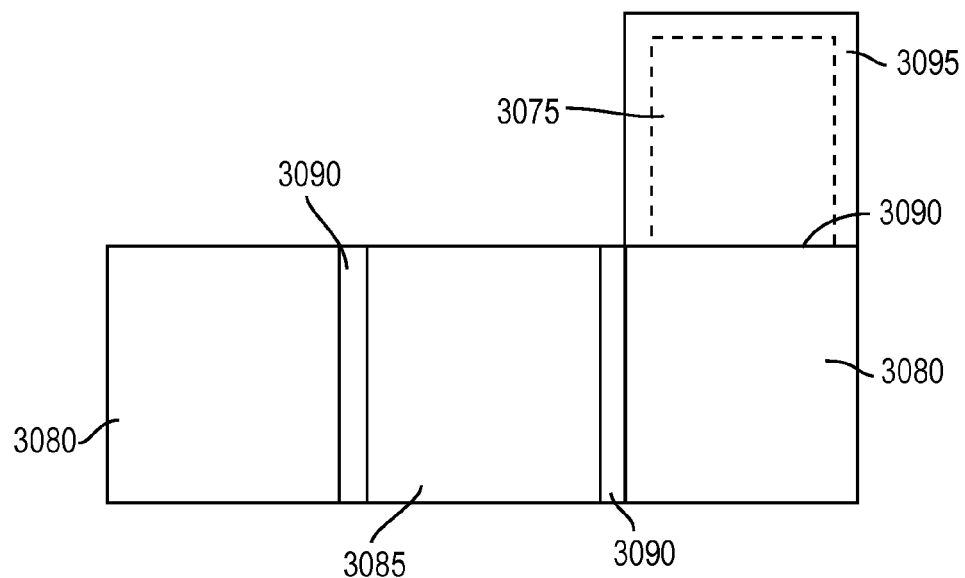
FIG. 17 is an exemplary view of an embodiment of a shelter for pets, which may be placed over a pet container, collapsed.

FIG. 17 depicts an alternate embodiment of the sound deadening pet shelter in the unerected or flat position. In this embodiment, the top panel 3085 is coupled to two side panels 3080 by two flaps 3090. Each side panel 3080 is coupled to one of the flaps 3090 which is coupled to a side of the top panel 3085. The back panel 3075 is coupled to a side panel 3080 via a flap 3090. This is different from the previous embodiment illustrated in FIG. 15, where the back panel 3075 was coupled to the top panel 3085. The embodiment in FIG. 17, also depicts attachment devices 3095 on two of the edges of the back panel 3075, however, in this embodiment the attachment devices 3095 are on adjacent edges of the back panel 3075 whereas in the previous embodiment the attachment devices 3095 were on opposite edges of the back panel 3075.

In assembling this embodiment of the present invention, the side panel 3080 having the back panel 3075 attached thereto is pivoted about the flap 3090 between the aforementioned side panel 3080 and the top panel 3085, until the back panel 3075 can be coupled to the top panel 3085 through an attachment device 3095. Then the opposing side panel 3080 to the aforementioned side panel 3080 is pivoted until the back panel 3075 can be coupled to a side panel 3080 through the remaining attachment device 3095, thereby forming the pet shelter into a partial cube shape.

Figure 18:
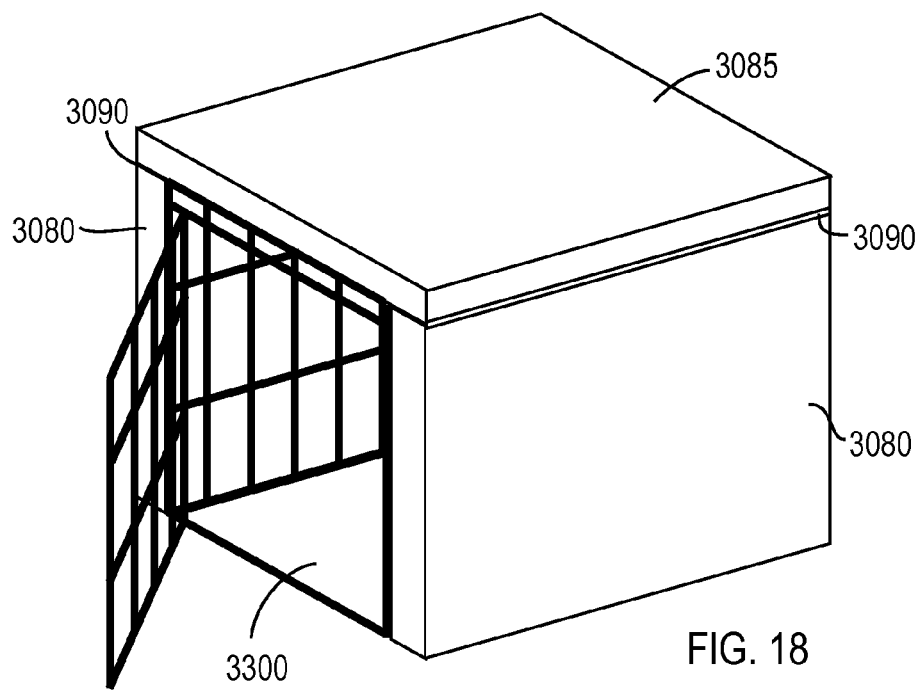
FIG. 18 is an exemplary view of a shelter for pets, which may be placed over a pet container, erected over a pet container.

FIG. 18 depicts an assembled sound deadening pet shelter in position surrounding a pet container 3300. The pet container 3300 may be any pet dwelling, such as a dog house, pet cage, pet travel case, a dog crate or the like. FIG. 18 shows a wire dog cage surrounded by the sound deadening pet shelter. It may be particularly desirable that the pet container 3300 have a door so that the scared pet may be placed in a secure environment in order to prevent injury. Closing the pet in the pet container 3300 may also prevent the pet from running away in its panic. The shelter, however, may also be used without the pet container 3300 and may simply be a stand alone shelter.

Figure 19:
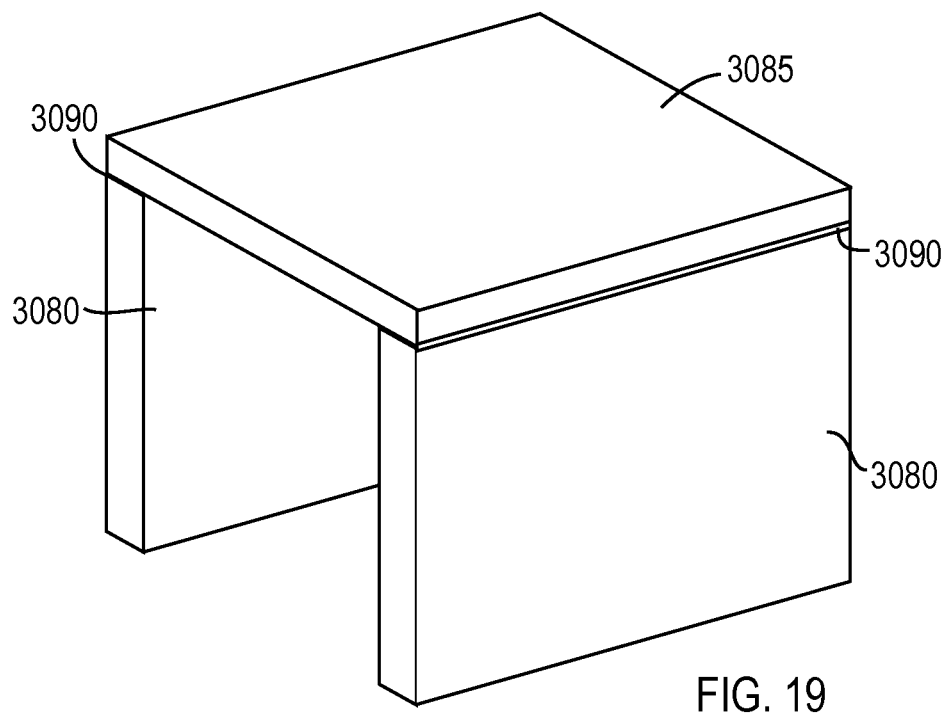
FIG. 19 is an exemplary isometric view of an embodiment of a shelter for pets, which may be placed over a pet container, erected.
Figure 20:
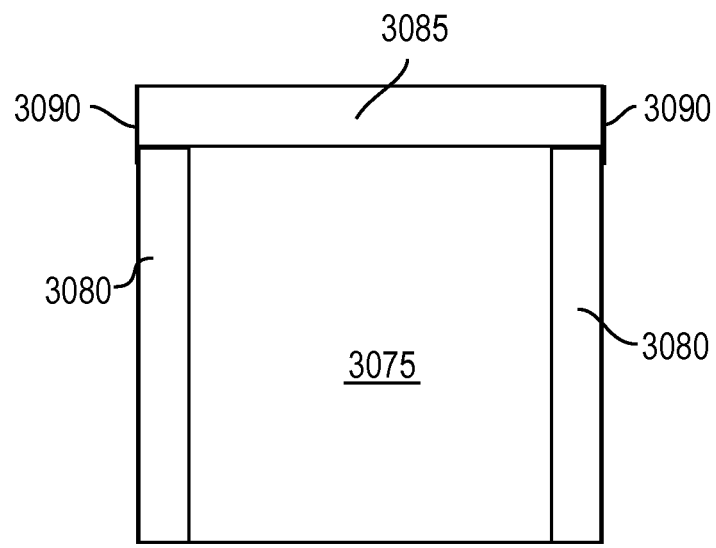
FIG. 20 is an exemplary front view of an embodiment of a shelter for pets, which may be placed over a pet container, erected.

FIGS. 19-20 illustrate a sound deadening pet shelter configured according to an embodiment of the present invention, such as those depicted in FIGS. 15-18, in use as a stand alone shelter. When the shelter is in use as a stand alone shelter, the opening may be turned so that it is close to the wall, leaving an opening for the pet to ingress or egress, while providing security and additional sound deadening for the pet.

Figure 21:
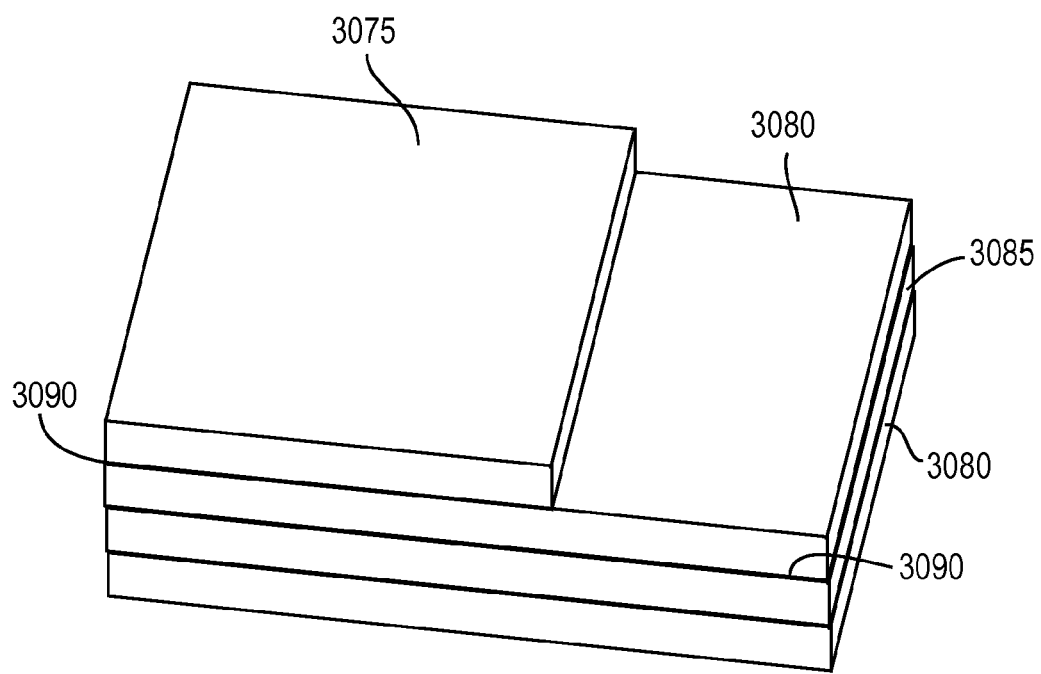
FIG. 21 is an exemplary view of a shelter for pets, which may be placed over a pet container, in the storage position.

FIG. 21 illustrates a sound deadening pet shelter in the folded or storage position. This position allows the sound deadening pet shelter to take up very little room when it is not in use. In order to fold the sound deadening pet shelter into the storage position, the pet shelter should be returned to the flat or unerected position. From this position, the side panels 3080 and the top panel 3085 may be placed on top of each other by folding the shelter at the flaps 3090. The back panel 3075 may then be folded on top of the other panels.

Figure 14:
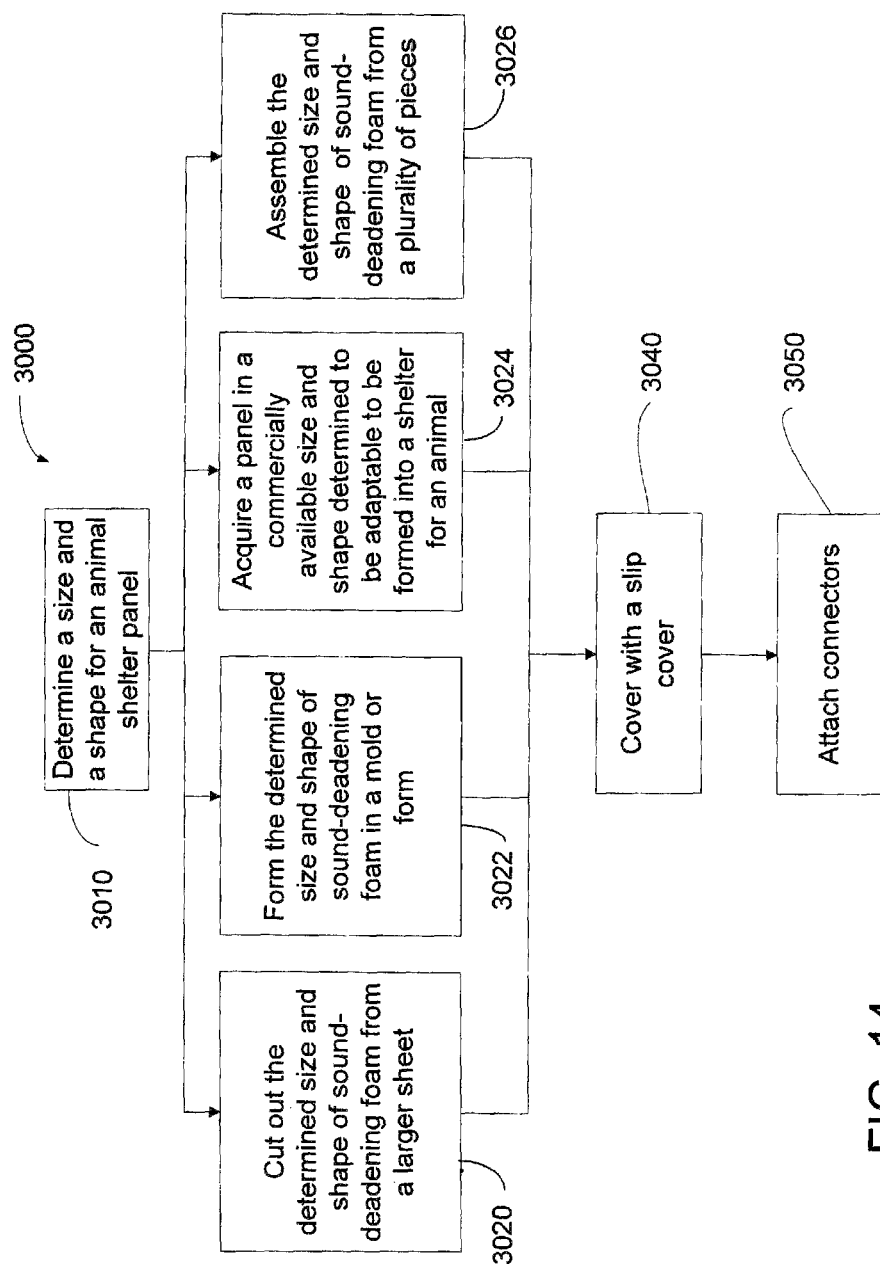
FIG. 14 shows an exemplary process flow diagram of embodiments of methods of manufacturing the present invention in which alternative second steps are shown.

FIG. 14 shows embodiments of the steps of the process 3000 for manufacturing a shelter of the present invention. In the first step 3010, the manufacturer determines a size and shape for creating an animal shelter. For example, FIGS. 1D, 2, 3 and 8B could be used as patterns for the shapes of panels for an animal shelter and sized for the type of animal to be sheltered. The manufacturer can then proceed by cutting the desired size and shape from a larger, commercially available sheet of sound-deadening foam, as shown in step 3020. As an alternative, the manufacturer may form the determined size and shape in a mold or form created for that purpose, as shown in step 3022. As a further alternative, if step 3010 results in a determination that a commercially available size and shape is adaptable to making the desired pet shelter, the manufacturer may acquire the desired panel in the marketplace, as shown in step 3024. This may be most economical for embodiments of the invention such as those shown in FIGS. 11A and 11B. In yet another alternative, the manufacturer may assemble the determined size and shape of panel from a plurality of pieces, as shown in step 3026. See FIG. 1D. Assembly may be by gluing, taping, heat fusion, or other joining method. The pieces may themselves have been made by steps 3020, 3022, or 3024. In step 3040, the sized and shaped sound-deadening foam is covered with a slip cover. A slip cover may be made of any flexible material. For example, cloth, plastic sheeting, or KEVLAR® fabric. Covering the foam with a slip cover includes the sub-steps of making a slip cover pattern, patterning and cutting the material, assembling the slip cover from the patterned and cut material and fitting the slip cover over the sized and shaped foam. In step 3050, connectors are attached to the slip cover or directly to any exposed portion of foam. Connectors may be VELCRO® strips, zippers, hook and eye fasteners, or other devices.

In any embodiment, the size of the sound-deadening pet shelter 100, 400, 500, 600, 700, 800, 900, 5000, 6000, 7000, 8000, or 9000 can be specifically sized for the pet or the pet container. Indeed, the sizes and shapes displayed in the figures are for exemplary circumstances and in no wise limit the present invention. Consider for example, that for a Chihuahua the shelter may be small enough to fit in a pant pocket when collapsed. On the other hand, as an example, a shelter for a Great Pyrenees Mountain Dog may fold or roll to fit into a backpack or suitcase.

The foregoing description has described selected embodiments of a collapsible sound-deadening animal shelter. While the invention has been particularly shown and described with reference to selected embodiments thereof, it will be readily understood by one of ordinary skill in the art that, as limited only by the appended claims, various changes in form and details may be made therein without departing from the spirit and scope of the invention. For example, shelter shapes such as tepees, yurts, igloos, etc., would be obvious in light of the present invention. Likewise, sound-deadening materials other than foams, such as rubber, viscoelastic adhesives, rubberized asphalt composites, vinyl-based polymer composites, mineral-filled vinyl copolymers, etc., are within the scope of the present invention.

What is claimed is:

1. A collapsible shelter for protecting an animal from noise, the shelter comprising:
 a top panel formed of a sound deadening material;
 a first side panel formed of the sound deadening material and fixedly coupled to the top panel by a first flap, wherein the first flap is positioned between the top panel and the first side panel and wherein the first flap creates a flexible junction between the top panel and the first side panel;
 a second side panel formed of the sound deadening material and fixedly coupled to the top panel by a second flap, wherein the second flap is positioned between the top panel and the second side panel and wherein the second flap creates a flexible junction between the top panel and the second side panel;

a rear panel formed of the sound deadening material, wherein the rear panel is fixedly coupled by a third flap to one of the top panel, the first side panel, and the second side panel;

a slip cover for covering the top panel, first side panel, second side panel, and rear panel, wherein the first flap, second flap and third flap are respectively configured between the panels when the slip cover is covering the panels, and wherein in an assembled position the rear panel is configured to releasably couple to the remaining of the top panel, the first side panel, and the second side panel to which the rear panel is not fixedly coupled by the third flap; and a pet container, wherein the collapsible shelter is structured to be deployed over and conformed to the pet container and to encompass the animal within the collapsible shelter.

2. The shelter of claim 1, wherein the first side panel is coupled to a first edge of the top panel and the second side panel is coupled to a second edge of the top panel opposing the first edge, and wherein the rear panel is coupled to a third edge of the top panel between the first and second edges.

3. The shelter of claim 1, wherein the first side panel is coupled to a first edge of the top panel and the second side panel is coupled to a second edge of the top panel opposing the first edge, and wherein the rear panel is coupled to one of the first side panel and the second side panel.

4. The shelter of claim 1, wherein the top panel, the first side panel, the second side panel, and the rear panel are an integral element and are configured to bend about the first, second and third flaps to transition between a folded state, an assembled state and an unassembled state.

5. The shelter of claim 4, wherein in the assembled state, the top panel, the first side panel, the second side panel, and the rear panel are configured to be coupled together to form the shelter, and wherein in the unassembled state, the top panel, the first side panel, the second side panel, and the rear panel are configured to be coplanar, and wherein in the folded state the top panel, the first side panel, the second side panel, and the rear panel are configured to be bent about the first, second and third flaps to lie flat on one another.

6. The shelter of claim 5, further comprising an attachment device coupled to edge portions of a face of the rear panel, the attachment device being configured to releasably couple together the top panel, the first side panel, the second side panel, and the rear panel.

7. A collapsible shelter for protecting an animal from noise, the shelter comprising:

a first panel of sound deadening material;

a second panel of sound deadening material fixedly coupled to the first panel at a first joint;

a third panel of sound deadening material fixedly coupled to the first panel at a second joint, wherein the second joint is on a side of the first panel opposite the side of the first panel with the first joint;

a fourth panel of sound deadening material coupled to the third panel by a third joint, wherein the third joint is transverse to the first and second joints, wherein the shelter is configured to transition between a stored state, an unassembled state, and an assembled state, wherein in the assembled state, the first panel, the second panel, the third panel, and the fourth panel are configured to bend about the first, second, and third joints, respectively, such that the panels are coupled together to define an interior space wherein the animal may be housed, wherein in the unassembled state, the first panel, the second panel, the third panel, and the fourth panel are configured to bend about the first, second, and third joints, respectively, such that the panels are side-by-side and coplanar, and wherein in the folded state the first panel, the second panel, the third panel, and the fourth panel are configured to bend about the first, second, and third joints, respectively, such that the panels lie flat on one another; and a pet container, wherein the collapsible shelter conforms to the pet container to thereby encompass the animal within the collapsible shelter.

* * * * *